(12) United States Patent
Huber et al.

(10) Patent No.: US 10,960,980 B2
(45) Date of Patent: Mar. 30, 2021

(54) SIDE GUIDE, SIDE GUIDE GROUP, CARGO DECK, AIRCRAFT

(71) Applicant: TELAIR INTERNATIONAL GMBH, Miesbach (DE)

(72) Inventors: Thomas Huber, Schliersee (DE); Richard Holzner, Stephanskirchen (DE)

(73) Assignee: Telair International GmbH, Miesbach (DE)

( * ) Notice: Subject to any disclaimer, the term of this patent is extended or adjusted under 35 U.S.C. 154(b) by 86 days.

(21) Appl. No.: 16/292,824

(22) Filed: Mar. 5, 2019

(65) Prior Publication Data

US 2019/0276148 A1    Sep. 12, 2019

(30) Foreign Application Priority Data

Mar. 7, 2018 (DE) .......................... 102018105216.2
Apr. 13, 2018 (DE) .......................... 102018108803.5

(51) Int. Cl.
*B64D 9/00* (2006.01)
*B60P 1/64* (2006.01)
*B63B 25/22* (2006.01)

(52) U.S. Cl.
CPC ............. *B64D 9/003* (2013.01); *B64D 9/00* (2013.01); *B60P 1/649* (2013.01); *B63B 25/22* (2013.01); *B64D 2009/006* (2013.01)

(58) Field of Classification Search
CPC .... B64D 9/003; B64D 9/00; B64D 2009/006; B64D 1/20; B60P 7/10; B60P 7/0892; B60P 1/649; B63B 25/22

USPC ......... 410/77, 78, 80, 92, 94, 95; 244/118.1, 244/137.1
See application file for complete search history.

(56) References Cited

U.S. PATENT DOCUMENTS

| | | | | |
|---|---|---|---|---|
| 5,234,297 A | * | 8/1993 | Wieck | B64D 9/003 |
| | | | | 410/77 |
| 2002/0131837 A1 | * | 9/2002 | Segura | B60P 7/13 |
| | | | | 410/77 |

FOREIGN PATENT DOCUMENTS

| | | |
|---|---|---|
| DE | 102009018487 A1 | 11/2009 |
| DE | 102010036983 A1 | 2/2012 |
| DE | 102015004767 A1 | 10/2016 |
| DE | 102017206186 A1 | 10/2018 |
| EP | 1179472 A2 | 8/2001 |
| WO | 2005012082 A1 | 2/2005 |

* cited by examiner

*Primary Examiner* — Stephen T Gordon
(74) *Attorney, Agent, or Firm* — Barnes & Thornburg LLP

(57) ABSTRACT

A side guide for guiding and/or holding cargo items, in particular containers and/or pallets, in an aircraft, comprising a fastening rail extending in the longitudinal direction (v), at least one side guide device, which can be fastened to the fastening rail in the longitudinal direction (v) at different positions (A, B, C, D) and at least one first and at least one second fastening device for fastening the side guide to a cargo deck of the aircraft, in particular in a perforated rail. The first fastening device engages around the fastening rail and/or engages in the fastening rail in such a way that the first fastening device can be displaced in the longitudinal direction (v), in particular relative to the second fastening device.

18 Claims, 13 Drawing Sheets

SIDE GUIDE, SIDE GUIDE GROUP, CARGO DECK, AIRCRAFT

The invention relates to a side guide for guiding cargo items, a side guide group having a plurality of corresponding side guides and a cargo deck or aircraft equipped with a corresponding side guide or side guide group.

It is well known that aircraft cargo holds are frequently modified for different purposes. For example, it may be necessary to configure a cargo deck depending on the cargo items to be loaded. Cargo items, e.g. containers or pallets, with standardized dimensions are used for transporting cargo in aircraft. For example, there are the following standard sizes for containers/pallets: 223.5 to 317.5 cm (88 inches×125 inches), 243.8 cm to 317.5 cm (96 inches×125 inches), 223.5 cm to 157.5 cm (88 inches×62 inches), 153.4 to 156.2 cm (60.4×61.5 inches), 119.3 to 153.4 cm (47×60.4 inches) and various combinations thereof. In the military sector, pallets measuring 274.3 cm to 223.5 cm (108 inches× 88 inches) are used. For particularly large cargo items, pallets with 243.8 to 497.8 cm (96×196 inches) or 243.8 to 605.8 cm (96×238.5 inches) are used, for example. The latter are also referred to as 16 ft or 20 ft pallets and are based on the standard sizes of ISO668 (Intermodal) containers for sea freight or truck freight. Side guides mounted on the cargo deck are used to hold and guide such standardized cargo items. In order to achieve optimum utilization of a cargo hold, it is necessary to offer a wide range of configuration options, with a high priority on fast conversion of the cargo deck. Suitable side guides must be quick and easy to install and reconfigure, as the cost of operating such aircraft is very high. Furthermore, the configuration should be very easy to carry out, as the personnel, who carry out these reconfigurations, often did not have any training or only poor training for the cargo decks used. In addition, the side guides must be very robust, since they are exposed to very high loads and gentle handling cannot be required due to the high time pressure during loading and unloading.

A cargo deck with corresponding side guides is often exposed to moisture, high temperature differences, dust and other raw influences. A defective cargo deck—even a defective functional element (roller, guide, latch, claw) of the cargo deck—can lead to the fact that the parking space cannot be used or in the worst case the corresponding aircraft cannot be used for several days. Such a failure is very expensive.

The loading of the cargo deck of an aircraft is clearly noticeable in the total weight of the aircraft so that it is desirable to save weight here.

Side guides are known from EP 1 179 472 A2, which make it possible to reconfigure a cargo deck quickly and easily so that different cargo items with different dimensions can be loaded. The side guides used there can be partially lowered for this purpose, so that other side guides assume the guiding and fastening function. A disadvantage of the cargo deck described in EP 1 179 472 A2 is that the configuration is sometimes very complex. In addition, a variety of functional elements, e.g. side ledgers, longitudinal ledgers, PDUs, have to be provided for the different configurations of the cargo deck, all of which have a very high overall weight.

From the DE 102010036983 a generic side guide is known.

It is an object of the present invention to provide a side guide for a cargo deck that allows a variety of different configurations, which is robust, easy to operate and, when loaded, results in a lightweight cargo deck. In addition, a corresponding side guide group and a corresponding cargo deck are to be provided.

A further challenge in this field of technology is that aircraft are used in different ways during their service life. For example, modern aircraft are often used to transport passengers, so that seats for passengers are located in the upper deck area and the lower deck area is equipped to receive cargo. These aircraft are sometimes converted, wherein the passenger deck is also converted into an upper cargo deck, so that cargo items, in particular pallets and containers, can be accommodated here as well. With such a conversion, the seats are removed and the floor panels are dismounted. Afterwards existing seat rails are replaced and partly new seat rails are attached. It is also common to attach seat rail part segments in order to attach functional elements, such as side guides or other latches, within the seat rails or perforated rails. A corresponding conversion is complex and expensive. It is therefore a further object of this invention to make such a conversion as simple as possible and to equip aircraft with a cargo deck that is as functional as possible, while always trying to keep the weight of the cargo deck as low as possible.

The said objects are solved by the subject matter of the inventions disclosed herein.

In particular, the objects are solved by a side guide for guiding and/or holding cargo items in an aircraft, wherein the side guide comprises:
a longitudinally extending fastening rail;
at least one side guide device which can be fastened longitudinally to the fastening rail at different positions,
at least two fastening devices for fastening the side guide to a cargo deck of the aircraft, in particular in/on a perforated rail,
wherein the at least one of the fastening devices engages around the fastening rail and/or engages in the fastening rail in such a way that the first fastening device can be displaced in the longitudinal direction, in particular relative to the second fastening device.

Side guides in aircraft are usually used to guide cargo in the longitudinal direction (x-direction) of the aircraft (from bow to stern, or from stern to bow). During flight, they absorb forces transverse (y- and z-direction) to the longitudinal direction and hold the cargo in position.

One idea of the present invention is that the side guide device, which performs the actual guiding and holding function of the side guide, is displaceably mounted in a fastening frame. The side guide device can therefore assume different positions to hold and guide cargo items of different dimensions. This eliminates the need for numerous side guide devices, which need to be located at different positions within the cargo deck. Preferably, the at least one side guide device can be moved along the fastening rail.

Another idea of the present invention is that the fastening device engages around the fastening rail and/or engages in the fastening rail in such a way that the fastening device can also be displaced in the longitudinal direction. The fastening device can, for example, be a fastening base that engages in corresponding perforated rails with corresponding pins or strips to fix the fastening rail to the cargo deck. The displaceability of the fastening device has various advantages. On the one hand, side guides equipped with corresponding sliding fastening devices can be mounted more easily on the cargo deck. In addition, appropriately equipped side guides can be used at a variety of points. For example, the cargo hold in the tail of the aircraft can be narrowed, so that other distances between perforated rails are specified.

The same side guide can also be used there due to the displaceability of the fastening device.

From a manufacturing point of view, corresponding side guides can be manufactured industrially and used for a large number of different aircraft.

The use of a fastening rail instead of a fastening frame or a U-profile has the further advantage that a highly functional side guide can be provided at very low weight. Due to the use of the fastening rail, it is also possible to reduce the overall height of the side guide, at least in the region free from the guide device.

In a preferred embodiment, at least one first and at least one second fastening device are provided for fastening the side guide in a perforated rail on a cargo deck of the aircraft.

In another preferred embodiment, the at least one first fastening device engages around the fastening rail and/or engages in the fastening rail such that the first fastening device is relatively displaceable in the longitudinal direction relative to at least one second fastening device in order to adjust the side guide to different distances of the perforated rail.

In one embodiment, the at least one first fastening device can be moved back and forth in a rear area of the fastening rail and the at least one second fastening device is fixed longitudinally relative to the fastening rail so that the fastening rail is aligned parallel to the transverse direction of the aircraft (y-direction) when the perforated rails are arranged inclined.

In one embodiment, the fastening rail has a cross-section of a double-T beam. The top section of the T-beam can be used to form a positive fit to the at least one side guide device. The lower section of the T-beam can provide an appropriate positive fit with one or more fastening devices. The individual T-beams of the double T-beam thus help to efficiently transfer tensile loads (z-direction) into the structure of the aircraft. Furthermore, this embodiment allows the displaceability of the fastening devices as well as that of the at least one side guide device to be ensured.

According to the invention, the double-T beam cross-section can also be defined as an X cross-section. In other words, the crossbeams of the individual T-beams do not necessarily have to run parallel to each other over their entire length but can have a certain inclination, especially in the middle.

In one embodiment, at least one of the fastening devices is fastened to the fastening rail via a positive fit with (side) play in such a way that the fastening rail can be rotated relative to the fastening device from a basic position. The twistability can be such that a twist of at least 10° or of at least 20° is possible in relation to the basic position. This rotation can take place in both the plus and minus direction.

According to the invention, the basic position can be defined in such a way that the fastening device extends essentially transversely to the fastening rail. If the fastening device snaps into a perforated rail, the perforated rail forms a right angle with the fastening rail in the basic position.

The play when engaging in the fastening rail allows it to rotate in relation to this basic position.

The degrees of freedom achieved in this way can be used to also anchor the side guide according to the invention in perforated rails or perforated rail segments that do not run in the longitudinal direction of the aircraft. As already explained, the cargo hold narrows in the rear area, so that correspondingly inclined perforated rails can be provided.

It is possible to design at least one side guide device in such a way that it can be removed upwards (z-direction) and fixed in another position. Preferably, however, a positive connection with the fastening rail is produced in at least one side guide device, so that displaceability is only provided in the longitudinal direction of the fastening rail. The at least one side guide device engages around the fastening rail and has the cross-section of a C-profile in the lower area. However, it is still possible to replace the side guide device by pushing the side guide device over one of the ends of the fastening rail. This ensures easy maintenance or replacement of the side guide devices. According to the invention, once the fastening rails have been installed, they can be equipped with different side guide devices in order to be able to offer different configurations.

In one embodiment, the side guide has at least one guide roller, which is mounted in the fastening rail so that it is mounted to be rotatably movable about an axis of rotation. The axis of rotation extends essentially parallel to the longitudinal direction of the fastening rail so that cargo items can be transported or guided transversely to the fastening rail. To accommodate the guide roller, optionally with a housing, the fastening rail in a preferred embodiment has a recess open at the top, for example in the form of a V-profile. The housing of the guide roller can have a corresponding shape, especially a V-shape.

Depending on the embodiment, the guide roller or the axis of the guide roller may or may not be connected to the side guide device. In one embodiment, the housing or a housing of the guide roller is an integral part of the side guide device. In another embodiment, the guide roller can be removed together with the housing and inserted in such a way that longitudinal displacement of the guide roller is no longer possible.

The side guide therefore has at least one guide roller, which facilitates the transport of the cargo items. This guide roller thus occupies different positions, as does the side guide device. A large number of guide rollers can be saved by the movable bearing of the guide roller. Furthermore, a modern cargo deck is so tightly fitted with functional elements (e.g. side guides, guide rollers, bolt claws, PDUs) that it is often difficult to find the right place for the necessary functional elements on the cargo deck. By purposefully saving on guide rollers and side guide devices according to the invention, a cargo deck can be produced that allows an even greater number of different configurations.

The side guide may include at least one locking device for locking the side guide at at least two different positions on the fastening rail. It is possible to design the side guide according to the invention in such a way that it can be moved into an area in which it performs the function of a stop during loading and unloading to protect the structure of the aircraft. This function is used especially in the cargo door area, e.g. the upper cargo deck, when cargo items, e.g. containers and/or pallets, are to be loaded by "pure turning", which are longer than the cargo door width. In this case, the side guide devices shall be pushed outwards as far as possible relative to the cargo door, close to the outer skin of the aircraft, in order to obtain as large a turning area as possible.

The locking device can include latching elements and counter-latching elements at defined positions on the fastening rail. Appropriately designed latching elements and counter-latching elements allow pre-defined positions to be taken by the side guide devices. These positions can be selected in such a way that cargo items with predefined standard dimensions can be guided. In this respect, these latching and counter-latching elements facilitate the engagement of a specific preset configuration.

The locking device may include at least one fastening pin inserted through holes in the fastening rail. In one embodiment, these holes run in the arranged state of the side guide in the longitudinal direction of the aircraft—i.e. transversely to the longitudinal direction of the fastening rail.

The fastening pin can be a ball locking pin that locks in place when inserted, preventing the fastening pin from slipping out due to vibrations, for example. The locking mechanism can be released by means of a button on the head of the pin so that the fastening pin can be easily removed.

In one embodiment, at least one side guide device can be fixed in a position relatively close to the end of the fastening rail. For example, it can be fixed within 5 cm of the end of the fastening rail. By specifying an appropriate fixation position so far outside—close to the aircraft skin—it is possible, for example, to provide so much space in the loading and unloading area that the cargo can be easily rotated in this area. At the same time, however, the guiding device serves as a stop to protect the aircraft structure.

The fastening rail can have a maximum width of 10 cm, in particular a maximum width of 8 cm. In one embodiment, the fastening rail is only approx. 6 cm wide.

The fastening rail can have a fastening length of at least 15, 20, 30 or 50 cm. Longer embodiments (e.g. 1 m to 1.5 m) are also conceivable. In this case, the fastening rail spans at least two, preferably three or more perforated rails. In such cases, the fastening rail is fastened to each crossed or spanned perforated rail by means of the necessary number of fastening devices. In one embodiment, the fastening rail is therefore relatively long, so that the fastening points in which the fastening devices are attached can be relatively far apart. Although this causes the fastening rail to become heavier due to its length, it is possible, when retrofitting an aircraft, to avoid having to provide additional perforated rails or seat rails for the side guides, as a result of which weight can be considerably reduced. In one embodiment, perforated rails are only provided for fastening the side guide where longitudinal beams are located.

One of the side guide devices may comprise a stop and/or a bolt claw, which is/are fixed to the fastening rail in such a way that the stop or bolt claw can be pivoted from a raised working position into a lowered rest position. In this respect, it is not only possible for the stop or the bolt claw on the side guide device to assume different functional positions in order to guide and hold the cargo items in these. In addition, the stop or the bolt claw can be lowered so that freight can pass over them. This allows further configurations of the cargo deck to be ensured. A cargo deck can be created that can be flexibly adapted for locking different cargo item sizes. This also makes it possible to create a cargo deck that has no (protruding) side guides and can be covered by one or more panels, e.g. for loading from a vehicle.

In one embodiment, the side guide has two side guide devices, wherein the internal side guide device can be pivoted between the working position and the rest position.

The side guide device can be attached to the fastening rail so that it can rotate about a pivot axis.

The stop or the bolt claw on the side guide device can have inclined surfaces on at least one side in order to move it from the working position to the rest position when a piece of cargo passes over it laterally.

The side guide device may include at least one bolt claw for at least partially engaging around the cargo items.

The bolt claw can be spring-mounted to the fastening rail. In this respect, it is possible to absorb the forces acting on the bolt claw resiliently and transfer them to the cargo deck via the fastening rail.

In one embodiment, at least one fastening device is equipped in such a way that it can be inserted obliquely into a perforated rail and anchored there by lowering it into the horizontal plane. For example, the at least one fastening device may have a strip for inserting the fastening device into the perforated rail along a direction of insertion and at least one pin opposite the strip for securing the fastening device against displacement transverse to the direction of insertion. The fastening device is preferably designed in such a way that the opposite pin sits in a hole in the perforated rail in the arranged state of the side guide.

In one embodiment, at least two of these pins are provided opposite the rail, so that forces acting in the transverse direction can be efficiently transmitted to the corresponding perforated rail.

The above object is also solved by a side guide group, wherein this side guide group comprises a plurality of side guides as already described, wherein the side guide devices of the individual side guides have at least one common profile rail slidably attached to the fastening rail. The rail can be rigidly or detachably connected to the individual side guide devices and guide the cargo items.

The rail may have bolt claws, preferably of different types. Since the cargo items differ not only in their transverse dimensions but also in their longitudinal dimensions, it is advantageous if the rail extends over longer sections. In this respect, suitable functional elements, in particular bolt claws, can be provided in such a way that a suitable holder is available for each cargo item. The bolt claws can be arranged directly above or offset from a corresponding fastening frame. It is therefore possible to select the position of the functional elements in the longitudinal direction of the aircraft independently of the position of the fastening rails. In addition, a rail can accommodate a large number of different bolt claws, which are preferably arranged at different distances from each other.

A corresponding side guide group is particularly advantageous in the loading and unloading area, as the freight can enter the cargo hold at an angle.

Furthermore, the object is solved by a cargo deck having at least one of the described side guide groups and/or at least one of the described side guides.

The advantages for a corresponding cargo deck are similar to those already described in connection with the side guide or side guide group.

The objects outlined at the beginning, in particular the easier conversion of a passenger aircraft into a cargo aircraft, are further solved by an aircraft according to the inventions disclosed herein.

In particular, the object is solved by an aircraft having a cargo deck, wherein the aircraft comprises the following load-bearing structure elements:
Outer skin of the aircraft,
Frames connected to the outer skin of the aircraft;
Crossbeams attached to the frames;
Longitudinal beams attached to the crossbeams;
Side profiles extending parallel to the crossbeams, in particular Z-profiles, which are connected (directly) to the outer skin of the aircraft via shear beams.

According to the invention, the aircraft is equipped with at least one side guide. The side guide can be one of the side guides as described above. The side guide may include a fastening rail extending in the transverse direction of the aircraft and at least one side guide device attachable to different positions of the fastening rail. According to the invention, the fastening rail may be connected to some of the aircraft's support structure elements via a first fastening point and a second fastening point, wherein the first fastening point is located above one of the side profiles and the second fastening point is located above one of the crossbeams.

According to the invention, a fastening point can be understood as the point or region in which tensile forces (z-direction) acting on the side guide are mainly introduced into the support structure of the aircraft. Where screws are used for fixing, the fastening point is essentially the region in which the screw engages the load-bearing structural elements. Where adapters are used as attachment devices which engage in seat rails, the fastening point shall be the region defined by the corresponding adapter. The fact that a fastening point is located above an element, for example above the side profile, does not necessarily mean that the fixing cannot take place within this element.

The advantage of the described solution according to the invention is that in the side areas of the cargo deck where there is a relatively large distance between the side profiles and the crossbeams, no additional seat rails need to be fitted which are not (directly) disposed above the crossbeams.

Weight can be saved by dispensing with corresponding seat rails or perforated rails.

In one embodiment, a distance of more than 15 cm, in particular more than 20 cm, may be provided between the first and the second or next fastening point. The first fastening point is preferably provided relatively close to the outer skin of the aircraft. In one embodiment, the shortest distance between the aircraft outer skin and the first fastening point is less than or equal to 30 cm. Embodiments are also possible where this maximum distance is less than 25 or less than 20 cm.

In one embodiment, the fastening rail is fastened to the side profile at the first fastening point via a fitting. In addition or alternatively, the fastening rail can be attached to the second fastening point on a perforated rail mounted on the crossbeam.

The use of a fitting allows easy retrofitting of a fastening point. Furthermore, the use of a fitting with a (short) perforated rail segment can save considerable weight compared to a perforated rail.

In one embodiment, at least one side guide is arranged in the area of the wing box. An arrangement in this area requires a particularly high degree of flexibility since the presence of the wings in these areas can lead to considerable deformation. The said side guide may, according to the invention, be connected to a carriage at a first fastening point, wherein the carriage is movably disposed in the transverse direction of the aircraft on a projection connected to one of the frames and/or the wing box. Due to the arrangement it is possible that a deformation of the frames does not influence the function of the side guide and the cargo deck. The required deformability is guaranteed. Resulting forces are introduced indirectly (via the frame) or directly into the wing box.

The carriage can have a receptacle extending in the transverse direction of the aircraft in which the projection engages positively. The receptacle preferably extends in the transverse direction of the aircraft. The receptacle can have a lubricant and/or an inner lining made of a sliding material, e.g. polyamide, and/or devices for force-free movement, e.g. roller bearings, of the projection within the receptacle, and be formed in a rectangular or square manner.

Another aspect of the invention refers to an aircraft having a cargo deck, wherein the aircraft comprises the following load-bearing structural elements:
 outer skin of the aircraft,
 frames connected to the aircraft outer skin;
 crossbeams attached to the frames;
 longitudinal beams fastened to the crossbeams;
 side profiles extending parallel to the longitudinal beams, in particular Z-profiles, which are connected via shear beams (directly) to the aircraft outer skin; and
 at least one side guide, wherein the side guide comprises a fastening rail extending in the transverse direction of the aircraft, at least one side guide device which can be fastened to the fastening rail at different positions, wherein the fastening rail is connected via a first fastening point and a second fastening point to load-bearing structural elements of the aircraft, wherein the first fastening point is located above one of the side profiles and the second fastening point is located above one of the crossbeams.

Further advantageous embodiments result from the sub-claims.

In the following, the invention is explained in more detail by reference to the drawings, wherein:

FIG. 14 shows a further view of a cargo deck having a plurality of side guides, wherein FIG. 14 shows the area of the wing box;

In the following description, the same reference numbers are used for identical and equally acting parts.

Usually, a Cartesian coordinate system is used to provide individual directions within an aircraft. Here the x-axis extends from the stern to the bow, the y-axis runs transversely to the x-axis and lies essentially in the plane spanned by the wings. The z-axis is perpendicular to the x- and y-axes.

Figure 1:
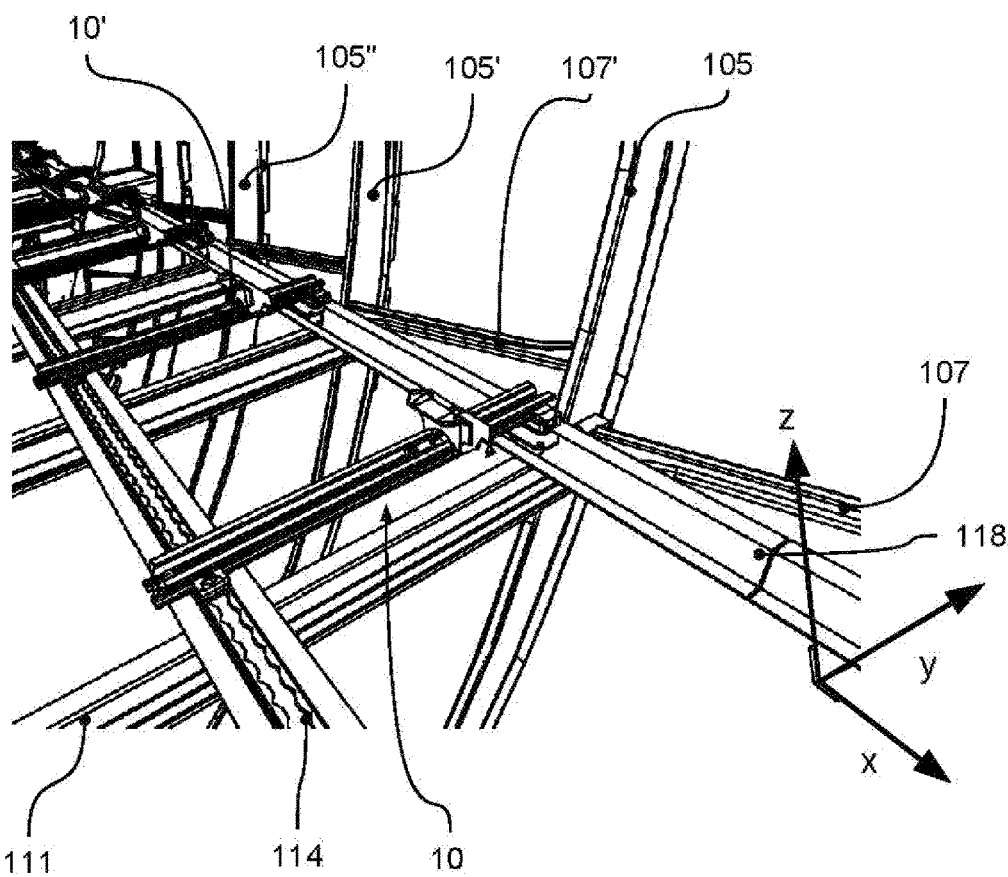
FIG. 1 shows a first view of a cargo deck without panels, wherein a plurality of side guides are arranged.
Figure 2:
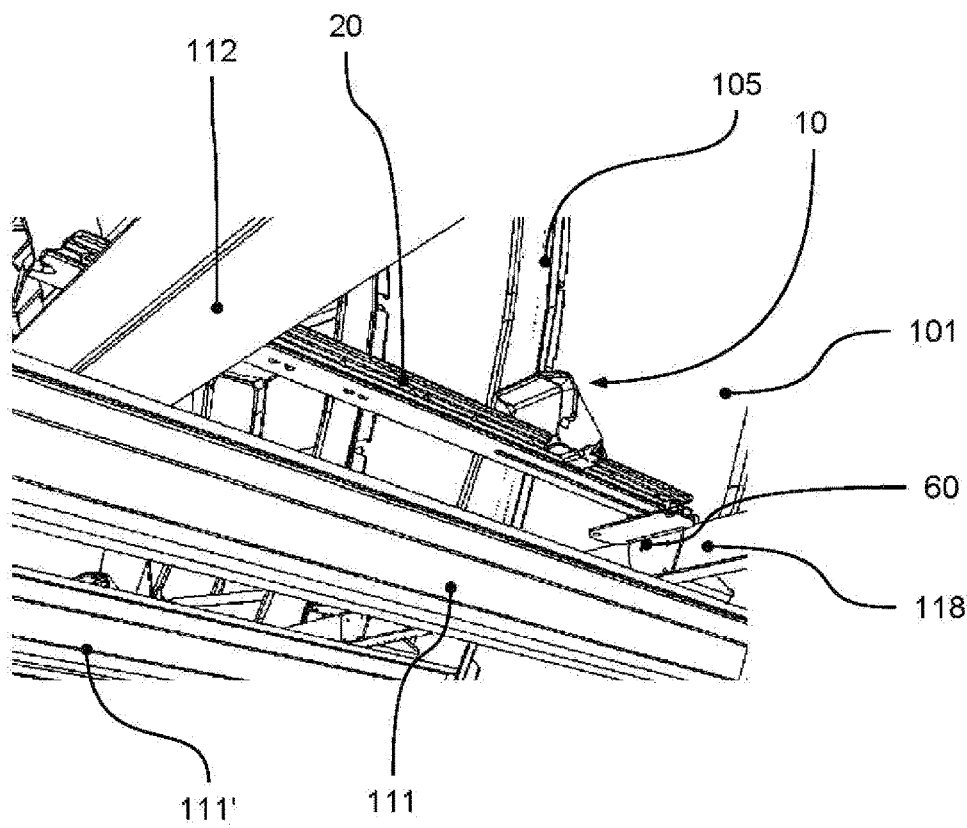
FIG. 2 shows another view of the cargo deck from FIG. 1.
Figure 3:
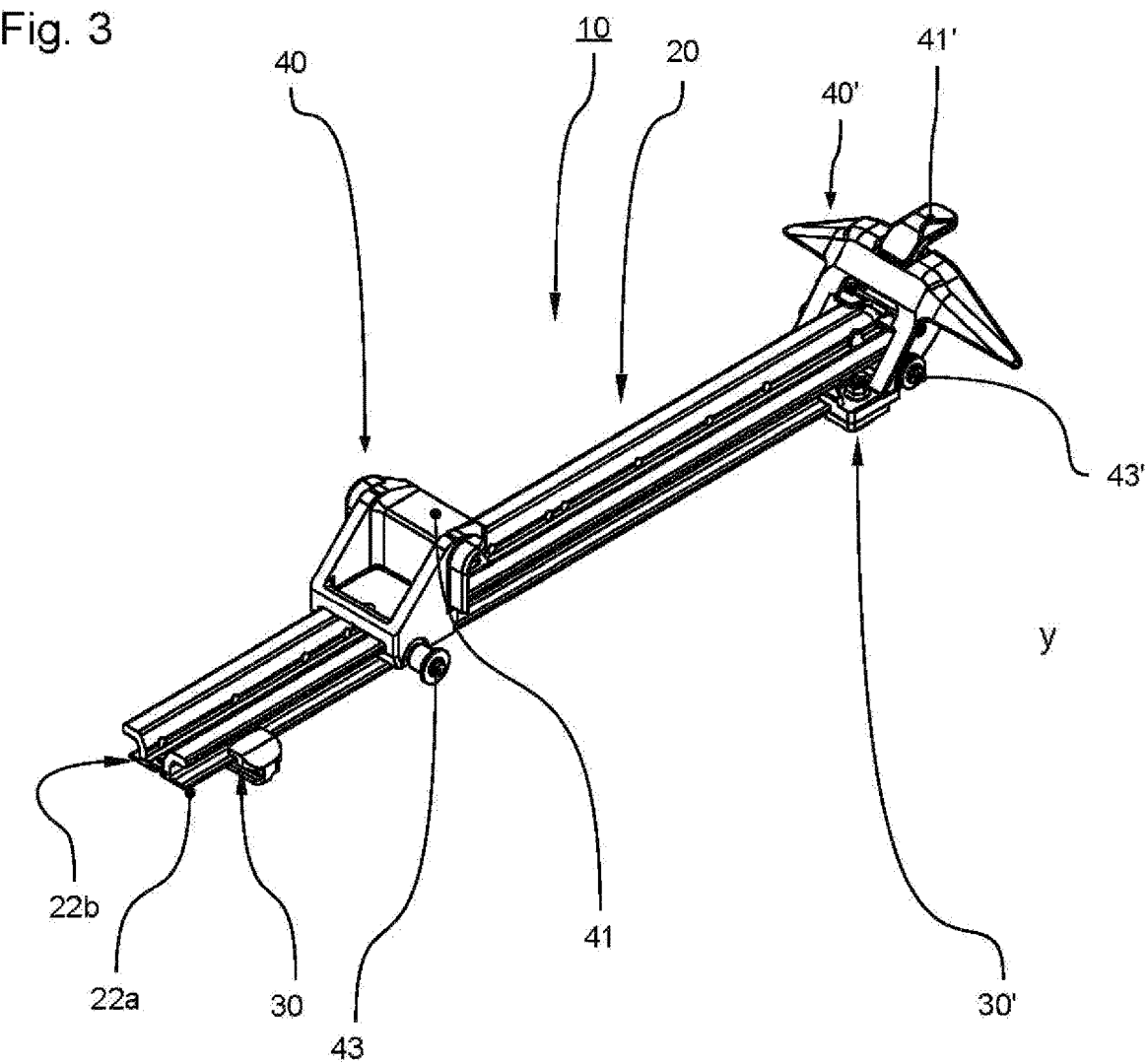
FIG. 3 shows a detailed perspective view of a side guide in accordance with the invention.
Figure 21:
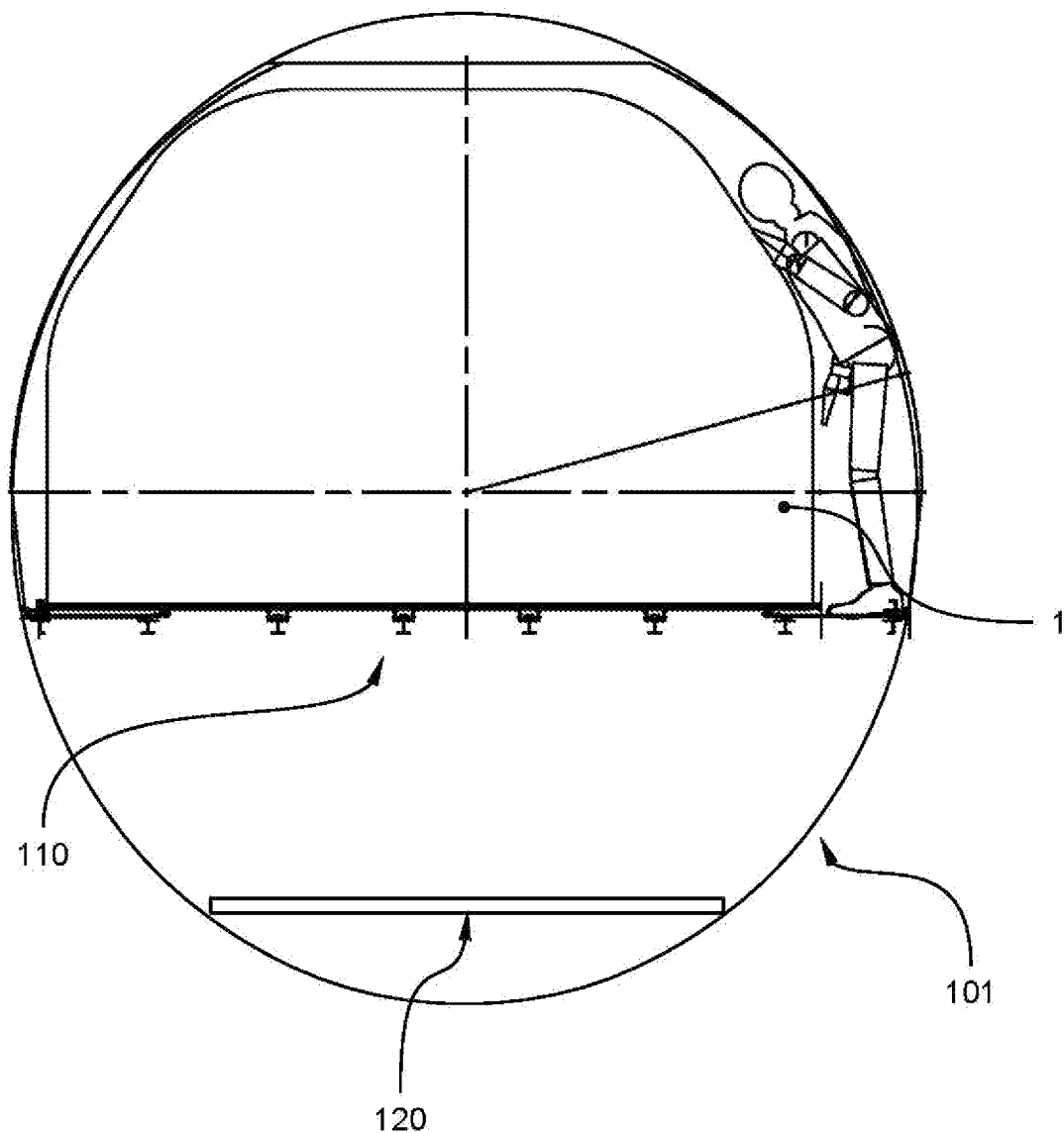
FIG. 21 shows a schematic cross-section through an aircraft fuselage with upper and lower cargo deck.

FIGS. 1 and 2 show an upper cargo deck (see FIG. 21). A plurality of circular frames 105, 105', 105", 105'" can be seen, on the outside of which the aircraft outer skin 101 is arranged. The frames 105, 105', 105", 105'" together with the aircraft outer skin 101 form the fuselage of the aircraft. Inside the aircraft, crossbeams 111, 111' run along the y-axis of the aircraft. The crossbeams 111, 111' are each attached with their ends to one of the frames 105, 105', 105" so that the fuselage is stiffened. The upper side of the crossbeams 111 defines a plane (x-y plane) on which the longitudinal beams 112 are preferably arranged at equal distances, e.g. from approx. 50 to 70 cm.

In the immediate vicinity of the frames 105, 105', 105", on each side of the upper cargo deck 110 and parallel to the longitudinal beams 112, a side profile, e.g. the Z-profile 118, extends parallel to the crossbeams 111, 111' and is connected to shear beams 107, 107' which are fastened directly to the aircraft outer skin 101. The shear beams 107, 107' each extend between two frames 105, 105', 105" at an acute angle towards the Z-profile 118. The shear beams 107, 107' reinforce the network of longitudinal beams 112 and crossbeams 111, 111' in such a way that the upper cargo deck 110 can absorb shear forces to a considerable extent. On the load-bearing structure elements described, side guides 10, 10', 10" designed in accordance with the invention are arranged. The side guides 10, 10' are each connected to the structural elements at two fastening points P1, P2 (see FIG. 4). The first fastening point P1 is located above the Z-profile 118, the second fastening point P2 above the longitudinal beam 112, on which a perforated rail 114 is mounted. The side guide 10 thus bridges the gap between the Z-profile 118 and the longitudinal beam 112, wherein the fastening rail 20 extends parallel to the crossbeam 111.

FIGS. 3 to 7 show a side guide 10 according to the invention in detail. This differs from the side guides 10, 10', 10" shown in FIGS. 1 and 2 by means of a second side guide device 40'.

Figure 4:
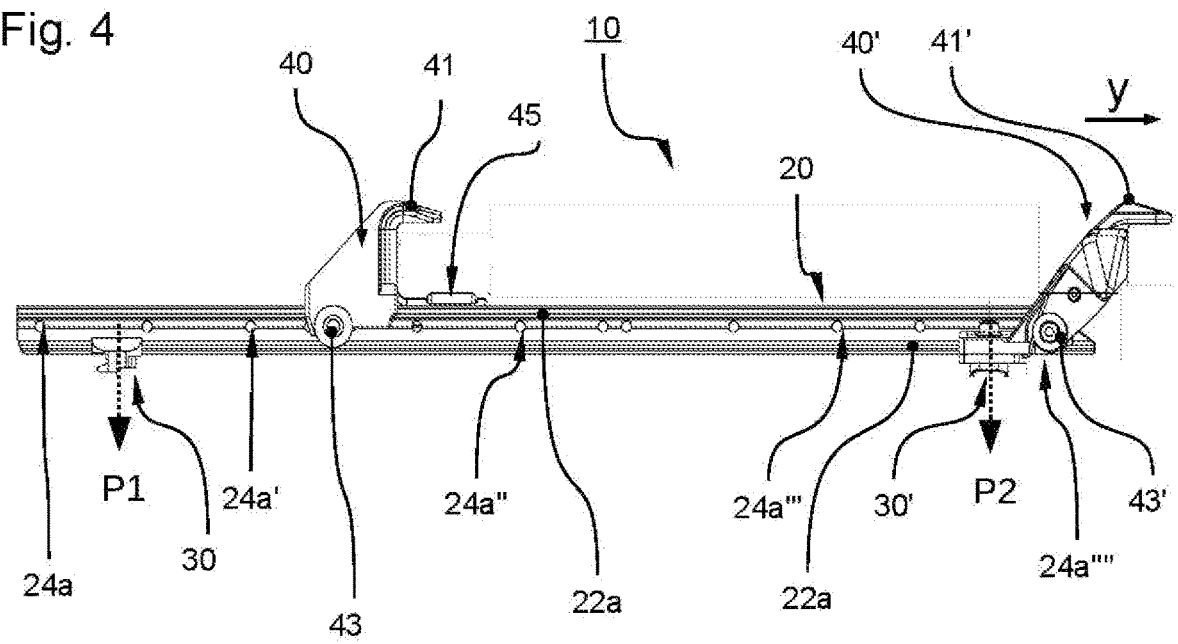
FIG. 4 shows a side view of the side guide according to FIG. 3.

The side guide 10 of FIGS. 3 to 7 comprises a fastening rail 20 on which a first fastening base 30 is arranged for fastening the side guide 10 at the first fastening point P1 and a second fastening base 30' for fastening at the second fastening point P2 (FIG. 4).

In the upper area of the fastening rail 20 there is a first side guide device 40 and a second side guide device 40' behind each other. The side guide devices 40, 40' differ in their detail design. The first side guide device 40 is thus essentially an angle profile 41 that is movably mounted on the guide rail 20. It is designed to engage flatly in the profile of containers 1 and freight pallets and to fix them in the Z direction. The second side guide device 40' has a much narrower bolt claw 41' and is designed in such a way that it can fold downwards when passing over sideways. Both side guide devices 40, 40' have fastening pins 43, 43' which engage in holes 24a, 24a', 24a", 24a'" of the fastening rail 20 via holes in the side guide devices 40, 40'.

The holes 24a, 24a', 24a", 24a'" provide (fixed) positions at which the first and/or second side guide device 40, 40' can be fixed.

In the embodiment example described, the fastening rail 20 has more than 5 holes 24a, 24a', 24a", 24a'", 24a"", where the side guides 40, 40' can be fixed. The first hole 24a is provided only a few centimeters (<3 cm) from the rear end of the fastening rail 20, so that the first side guide device 40 can be brought into a position where a guide plane defined by the first side guide device 40 (approx. at 4.5 cm) coincides with or is behind the first fastening point P1 (approx. at 5 cm). When the first side guide device 40 is in this position, the available space on the upper cargo deck 110 can be optimally utilized. This can be advantageous if cargo items, e.g. a container 1 (see FIG. 21), is turned on the cargo deck. Also at the front end of the fastening rail 20 there is a hole, namely the fourth hole 24a"", which is only a few centimeters away from the front end of the fastening rail 20. The fastening pin 43' is inserted in this fourth hole 24"" and holds the second side guide device 40' in such a way that it can be folded down to the front beyond the fastening rail. In a preferred embodiment example, the fastening rail is beveled in this area.

Figure 8:
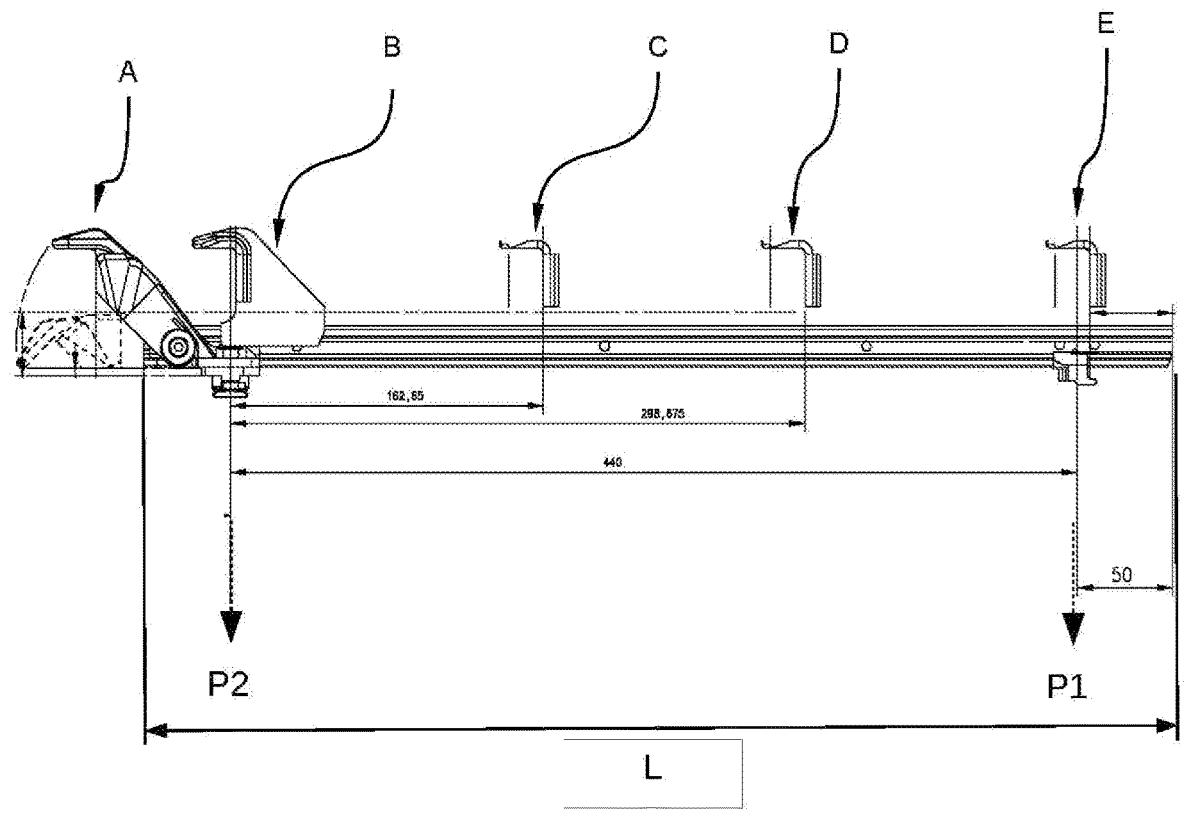
FIG. 8 shows various different positions that the side guide device of the side guide from FIG. 3 can assume.

The folding down of the second side guide device 40' into a rest position is schematically indicated in FIG. 8. FIG. 8 also shows the first side guide device 40, which is fixed in different locking positions B, C, D, E. The second side guide device 40' is located in the latching position A. FIG. 8 also contains millimeter specifications, which indicate a distance between the guide plane specified by the first side guide device 40 in the respective position and the first or fastening point P1 or P2.

Figure 6:
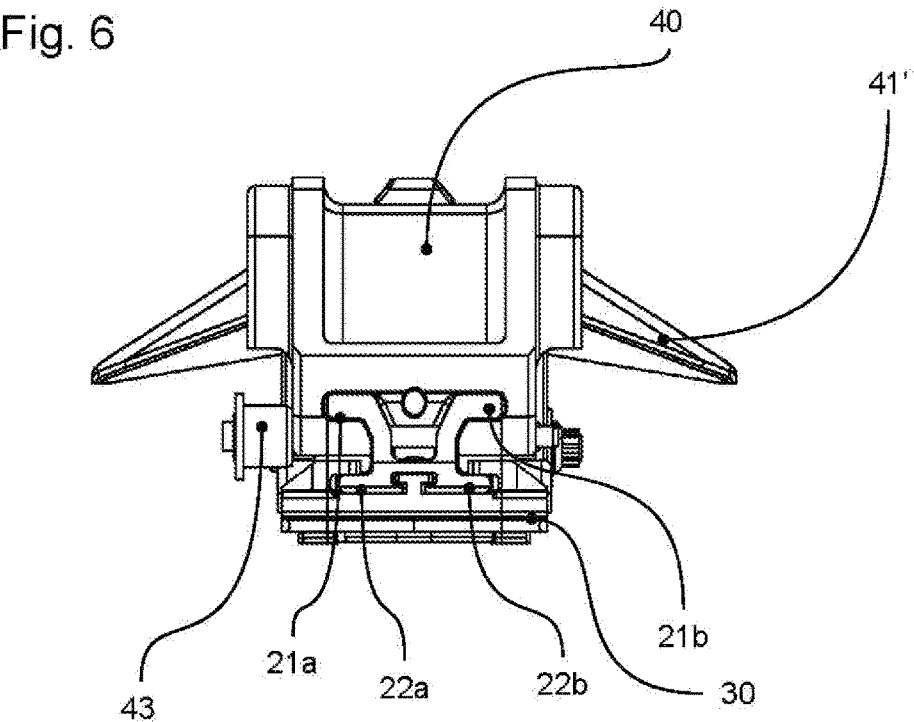
FIG. 6 shows a rear view of the side guide according to FIG. 3.
Figure 7:
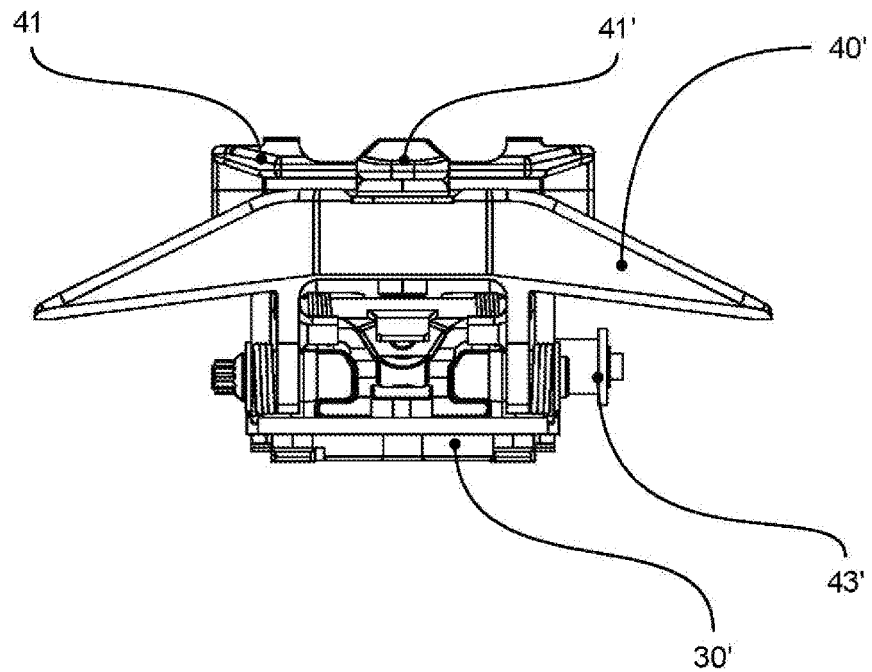
FIG. 7 shows a view from the front of the side guide according to FIG. 3.

As can be seen from FIG. 6, the fastening rail 20 has a cross-section which essentially corresponds to an X, wherein the ends of the X extend parallel to each other. Finally, in the upper area, there is a left and a right upper engagement strip 21a and 21b, respectively. In the lower area, a left and a right lower engagement strip 22a and 22b, respectively, are provided. As can be seen from FIG. 6, the first fastening device grips the upper engagement strips 21a, 21b and thus provides a positive locking, which makes it possible to move the first fastening device back and forth in the longitudinal direction v in the manner of a carriage on the fastening rail 20. The positive locking enables forces acting in the z-direction of the aircraft to be transmitted to the cargo deck via the fastening rail 20.

As shown in FIG. 4, the first side guide device 40 may have a guide roller 45 attached to the first side guide device 40 in such a way that it can be moved together. The rotation axis of the first guide roller 45 runs parallel to the longitudinal direction v of the side guide 10.

The second side guide device 40' can be designed in the same way as the first side guide device 40 so that it can also be moved along the fastening rail 20. Alternatively, the second side guide device 40' can simply be fixed to predefined positions on the fastening rail 20 using the fastening pin 43'.

As already explained, the side guide 10 has the first fastening base 30 (rear) and the second fastening base 30' (front). As can also be seen from FIG. 6, the first fastening base 30 also embraces the fastening rail 20, wherein a positive connection is made to the lower first and second engagement strips 22a, 22b. Furthermore, a guide groove 27 is provided in the rear half of the fastening rail 20 on the underside (see FIG. 5) of the fastening rail 20. This guide groove 27 has undercuts so that, as shown in FIG. 6, a T-beam projection of the first fastening base 30 can engage. In this respect, z-forces are transferred to several contact surfaces. The first fastening base 30 can be moved back and forth in the rear area of the fastening rail 20.

Theoretically, it is conceivable to provide additional fastening devices to fix the first fastening base 30 at certain positions relative to the fastening rail 20. In the described embodiment example of the invention, however, no such fastening devices are used, so that the first fastening base 30 is theoretically also movably mounted even when the side guide 10 is installed (see FIG. 1).

The second fastening base 30' can be arranged in a corresponding way on the fastening rail 20. In the embodiment example shown in FIGS. 3 to 7, the fastening mechanism of the second fastening base 30' differs considerably. The second fastening base 30' can thus be inserted from below into corresponding fastening base holes 25, 25', 25", 25'" of the fastening rail 20 using two guide pins provided for this purpose. Thus the second fastening base 30' is fixed in longitudinal direction v relative to the fastening rail 20. On the upper side of the second fastening base 30', removable engaging elements can be mounted which engage around the lower engagement strips 22a, 22b, so that z-forces can also be dissipated via the second fastening base 30'.

Both the first fastening base 30 and the second fastening base 30' are designed to be arranged in perforated rails 114 or in perforated rail segments 61.

Figure 13:
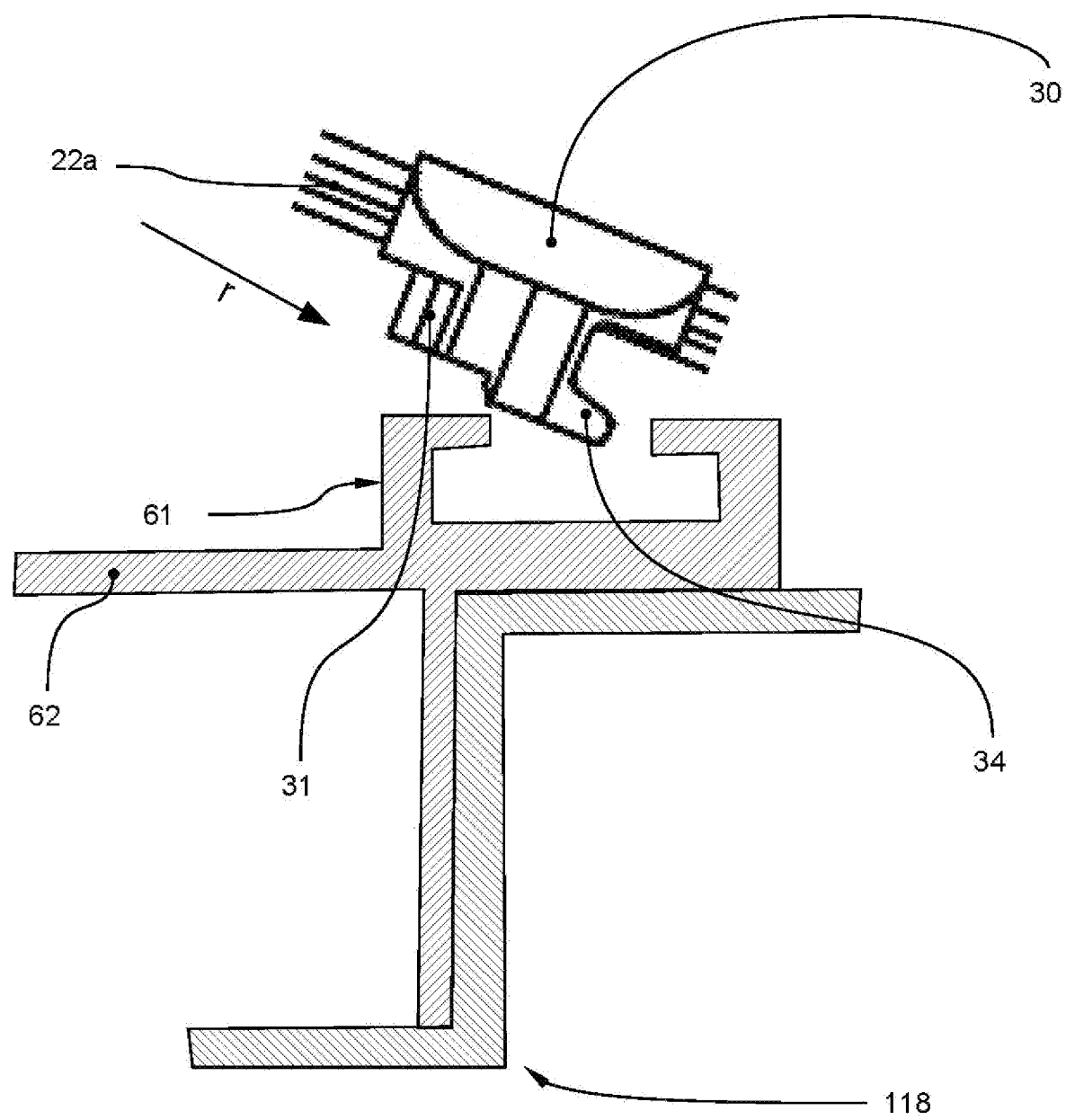
FIG. 13 shows a detailed view of the fastening device from the side.

The first fastening base 30 has a strip 34 which, as shown in FIG. 13, can be inserted obliquely into a perforated rail 114 or into a perforated rail segment 61. As soon as the strip 34 is inserted into the perforated rail segment 61, the side guide 10 can be folded down together with the first fastening base 30 and, optionally, with the second fastening base 30', wherein the hole pin 31 opposite the strip 34 engages in corresponding holes of the perforated rail segment 61. In this way, the strip 34 ensures that z-forces can be transferred in the attached state. The hole pins 31 secure the side guide against lateral displacement in the longitudinal direction (x-direction of the aircraft).

Figure 5:
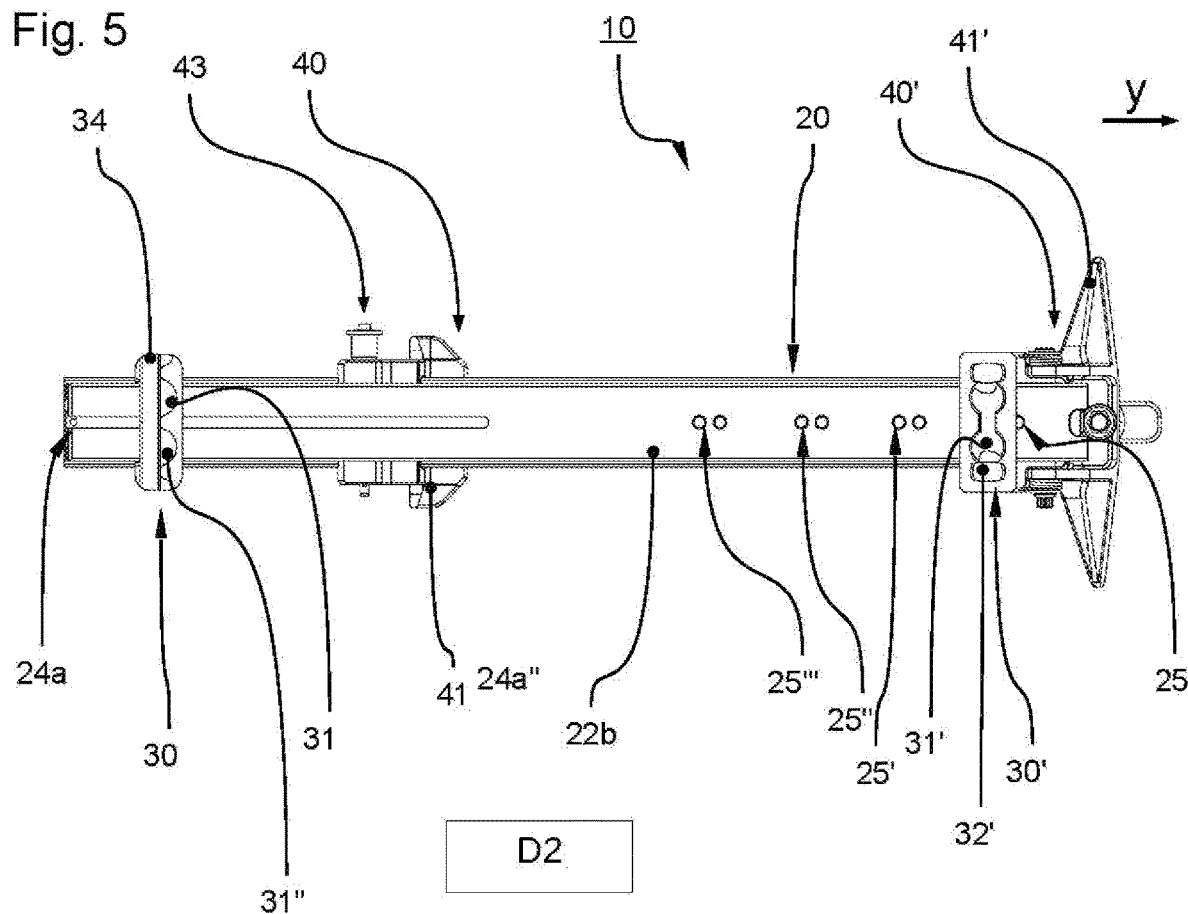
FIG. 5 shows a view from below of the side guide according to FIG. 3.

In the embodiment example shown in FIG. 5, two complete hole pins 31 are provided.

It is possible to vary the number of existing hole pins according to the invention. In a minimum version, only one hole pin 31 is provided. Theoretically, there may be more than two complete hole pins 31. The complete hole pins shown in FIG. 5 have the shape of a semicircle in a view from below.

The second fastening base 30' also has two hole pins 31', which can be inserted from above into a corresponding perforated rail. These hole pins 31' are also designed to prevent a transverse displacement in the perforated rail 114 or in a perforated rail segment 61. To absorb z-forces, locking elements 32' are provided on the side of the hole pins 31', which can be turned from a rest position into a locking position in which the second fastening base 30' engages in the perforated rail 114 in such a way that z-forces can also be dissipated.

Figure 10:
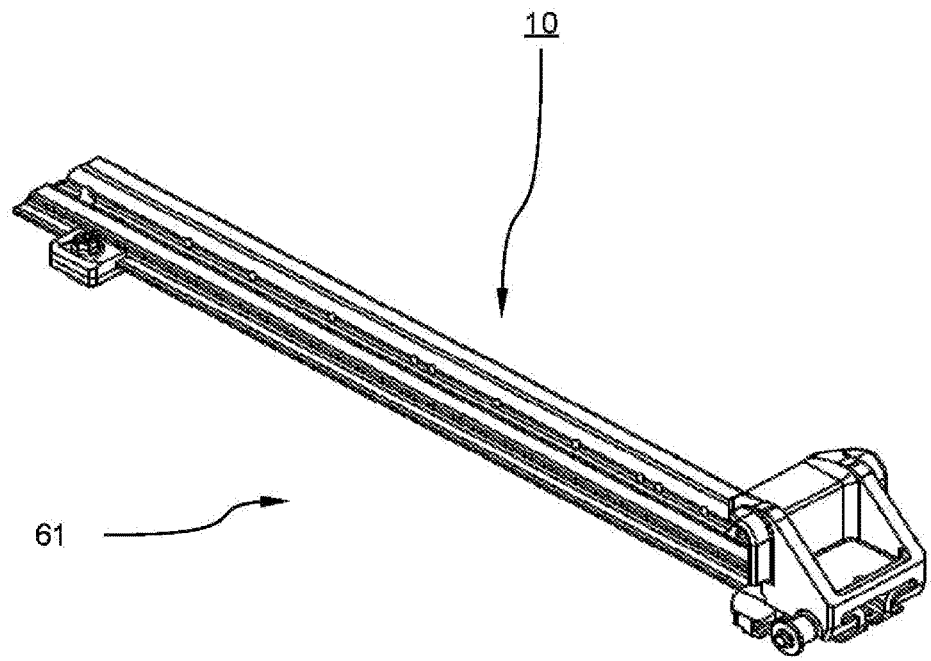
FIG. 10 shows a further variant of the side guide according to the invention, as already shown in FIGS. 1 and 2.
Figure 11:
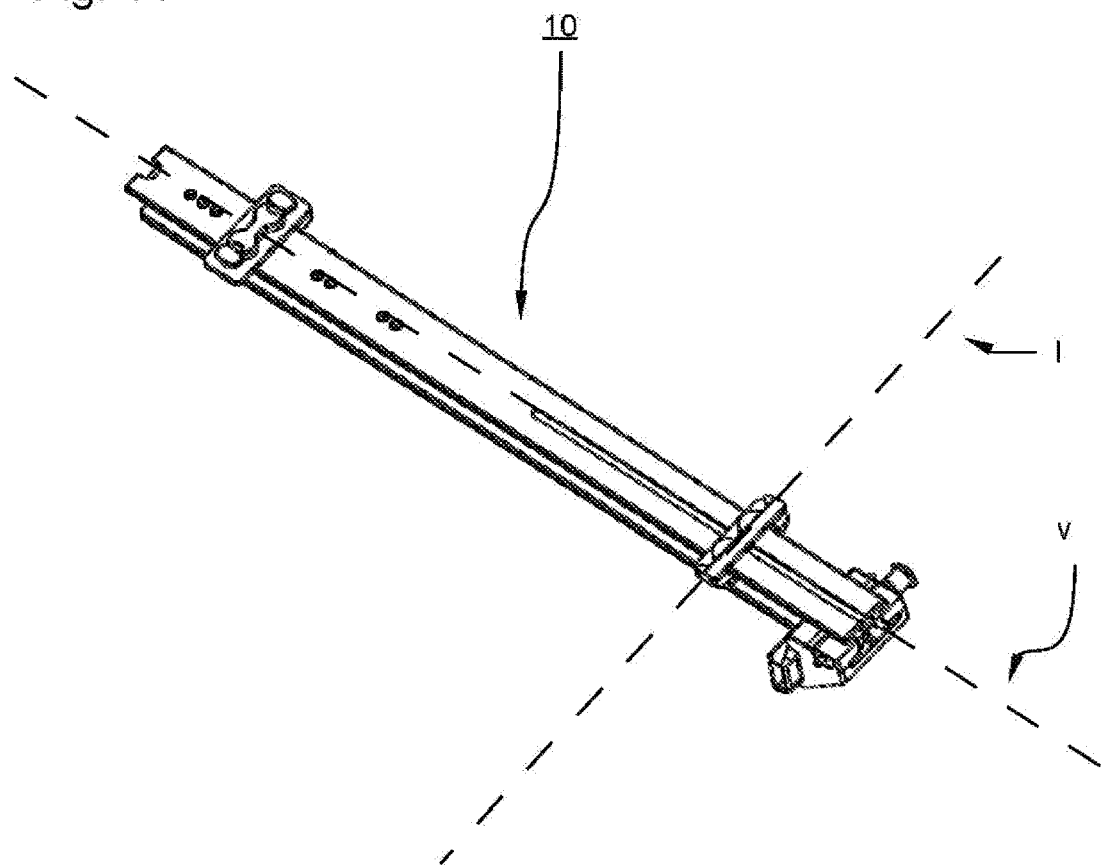
FIG. 11 shows a view from below of the side guide according to FIG. 10.

In one embodiment, the side guide 10, as described in FIGS. 3 to 7, and the side guide 10, as shown in FIGS. 10 and 11, can be arranged in obliquely extending perforated rail segments 61 and/or in obliquely extending perforated rails 114. In this constellation, "obliquely extending" means that the respective perforated rail 114 does not extend parallel to the longitudinal direction (x-direction) of the aircraft. In a preferred embodiment example, the fastening rail 20 extends parallel to the transverse direction of the aircraft (y-direction) despite the obliquely extending perforated rails 114 or perforated rail segments 61.

In accordance with the invention, a corresponding arrangement of the side guide 10 is made possible by the fact that the first and/or the second fastening base 30, 30' can be rotated in relation to the longitudinal direction v of the fastening rail 20.

Figure 12:
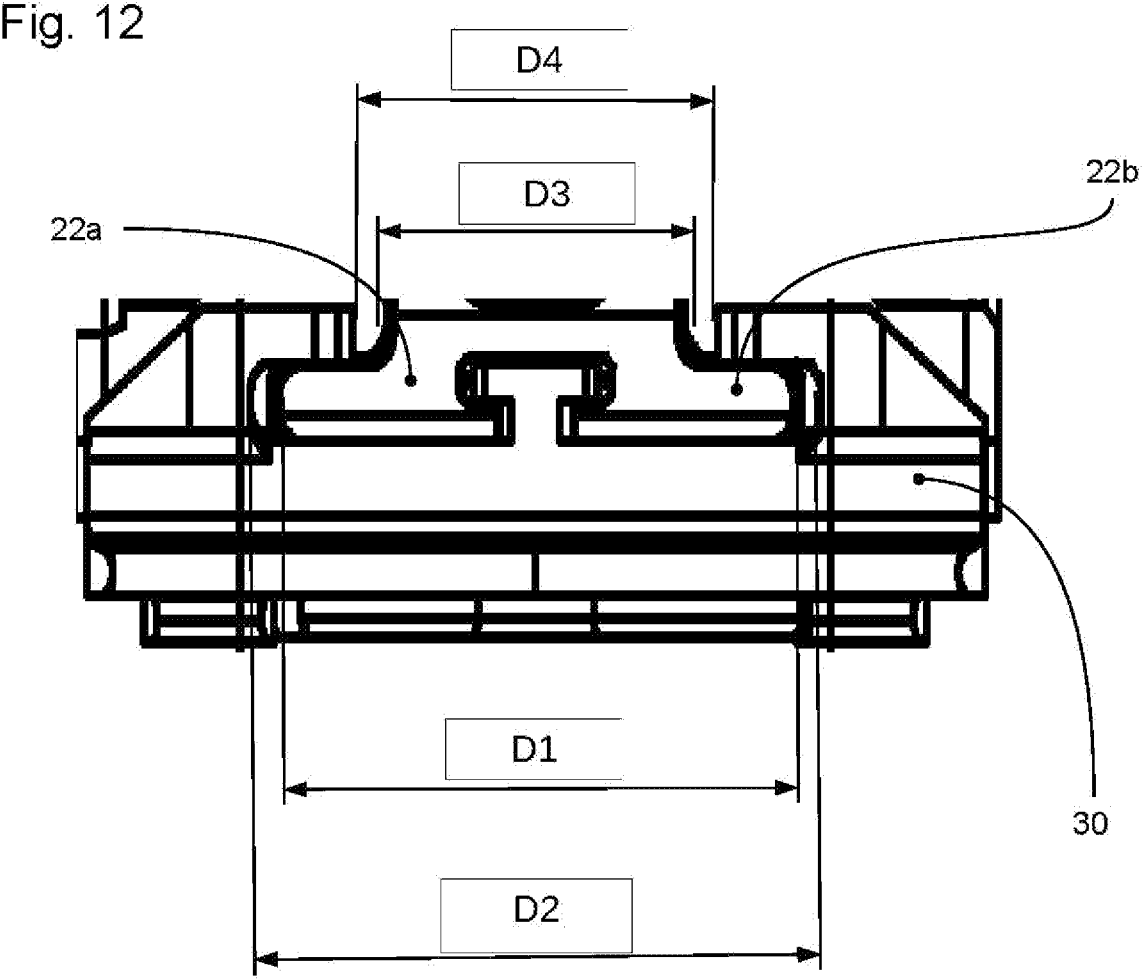
FIG. 12 shows a detailed view of the fastening device from the rear.

FIG. 11 shows an example of the first fastening base 30 in a basic position in which the longitudinal direction v of the fastening rail 20 forms a right angle with a perforated rail axis I defined by the pin profile of the first fastening base 30. In the embodiment example, the first fastening base 30 can be rotated by ±15° in relation to this basic position. As shown in FIG. 12, a certain (lateral) play is provided in the positive locking between the fastening rail 20 and the first fastening base 30 for this purpose. The play results from the fact that the rail width at least in the lower region (compare lower engagement strips 22a, 22b) has a rail width D1 which is smaller than a first clear width D2 of the fastening base. In addition, the base width D3 is smaller than the second clear width D4 of the first fastening base 30. The T-profile is also correspondingly spaced from the guide groove 27. In absolute values, the difference can be up to 7 mm, preferably 2 to 6 mm.

In one embodiment example, the rail width D1 essentially corresponds to the first clear width D2 and/or the base width D3 essentially corresponds to the second clear width D4. A twistability, e.g. by 10° to 15°, can be achieved in this constellation in that the inner walls of the first and/or second fastening base 30, 30' have a convex shape at least in sections. This convex shape of the inner walls is preferably present where the inner walls rest vertically against sections of the fastening rail 20, in particular the engagement strips 22a, 22b, and/or corresponding vertical sections face the fastening rail 20 with very little play.

In relative values, the difference can lie in the interval from 1 to 20, in particular in the interval from 5 to 15%. According to the invention, it is possible to provide only the first fastening base 30 or only the second fastening base 30' with a corresponding play. In a preferred embodiment, both fastening bases 30, 30' have a corresponding play.

Figure 9:
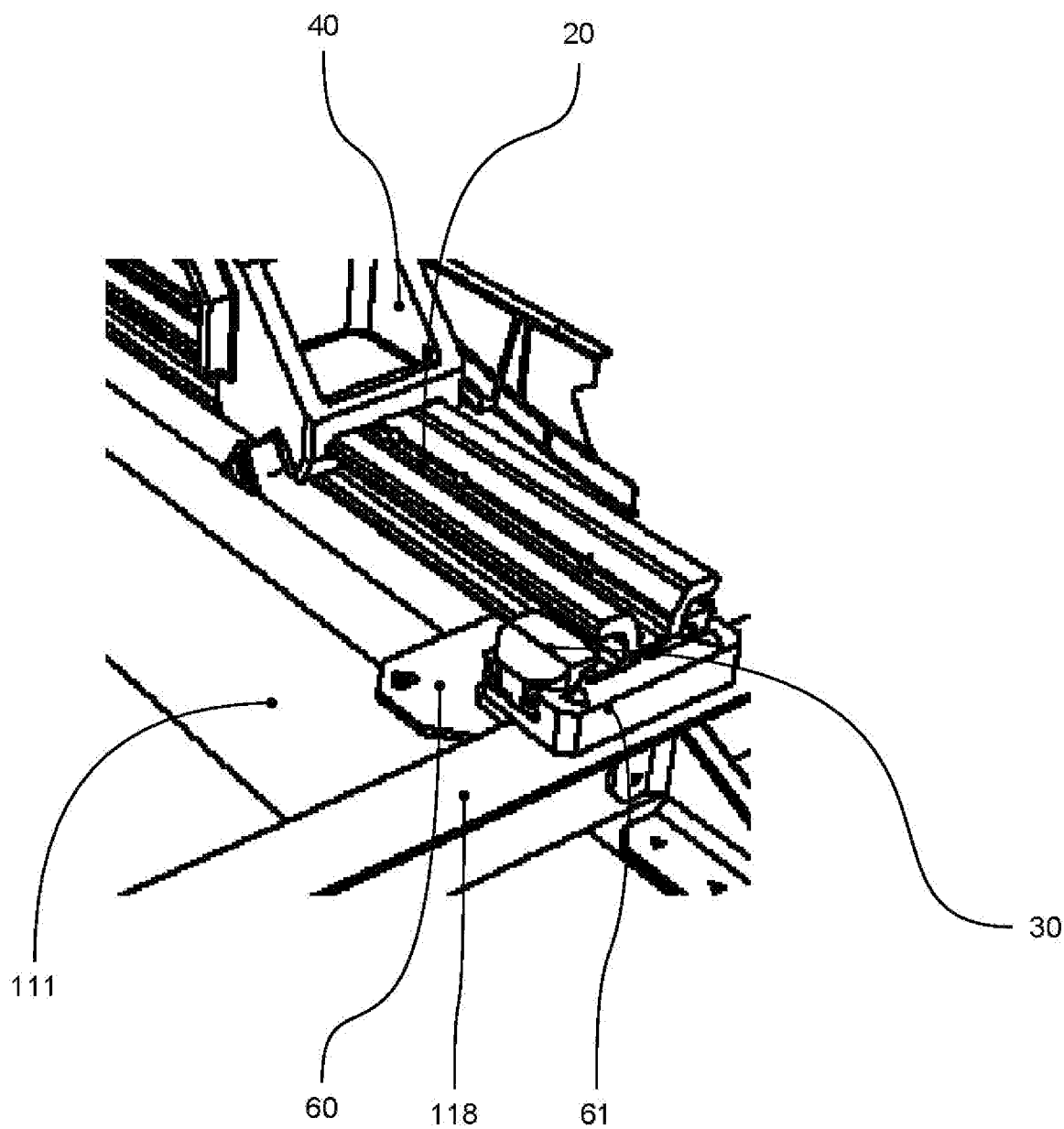
FIG. 9 shows a detailed view of the rear part of the side guide according to FIG. 3.

As already explained, the first fastening base 30 is preferably connected to the Z-profile 118 of the aircraft via a fitting 60 (see FIGS. 9 and 12). An appropriate fitting can be screwed or riveted when converting a passenger aircraft to a cargo aircraft with the Z-profile 118. FIG. 13 shows a cross-section through a corresponding fitting 60, wherein the fitting has an angle in its lower area in order to abut flatly against the Z-profile 118. The perforated rail segment 61 is provided in the upper area. Depending on the embodiment of the side guides 10 or the first fastening base 30, this can have one hole, two holes or three holes. Theoretically, it is also conceivable to provide for more than three holes. The embodiment shown in FIG. 13 comprises a projection 62 on which panels can be arranged to form a walk-on area of the cargo deck.

Figure 14:
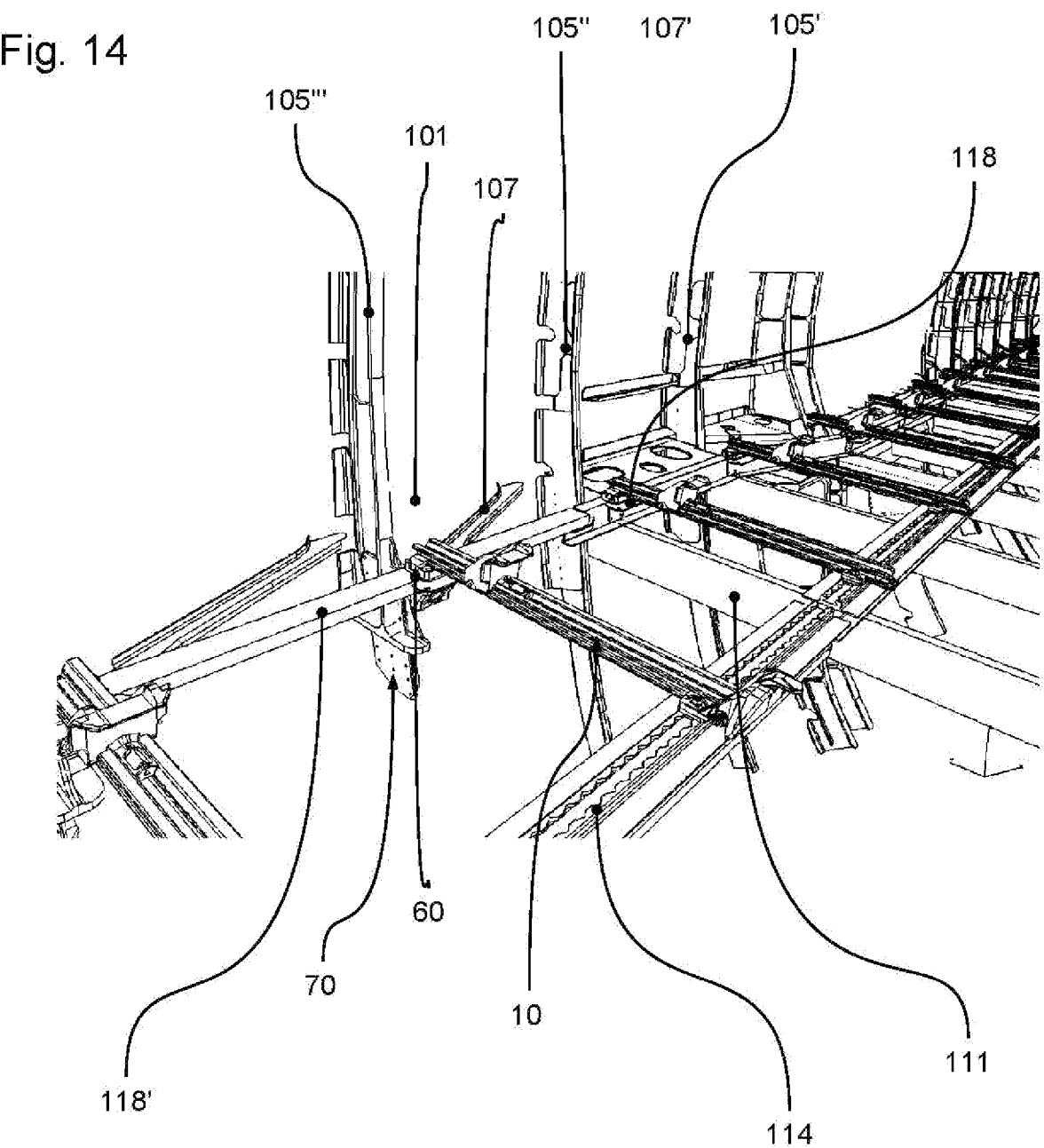
Figure 15:
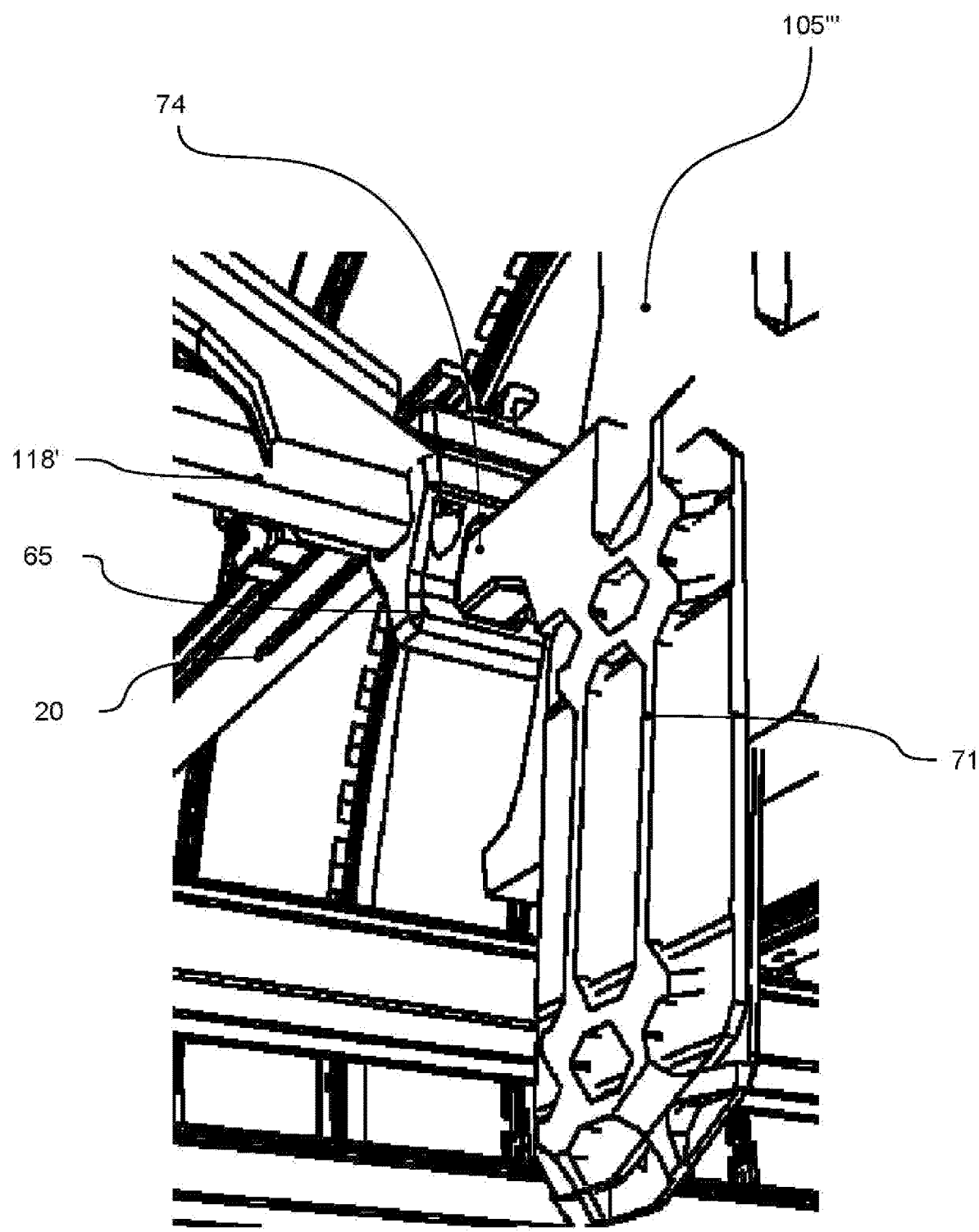
FIG. 15 shows a fastening body for fastening the side guide from FIG. 14.
Figure 16:
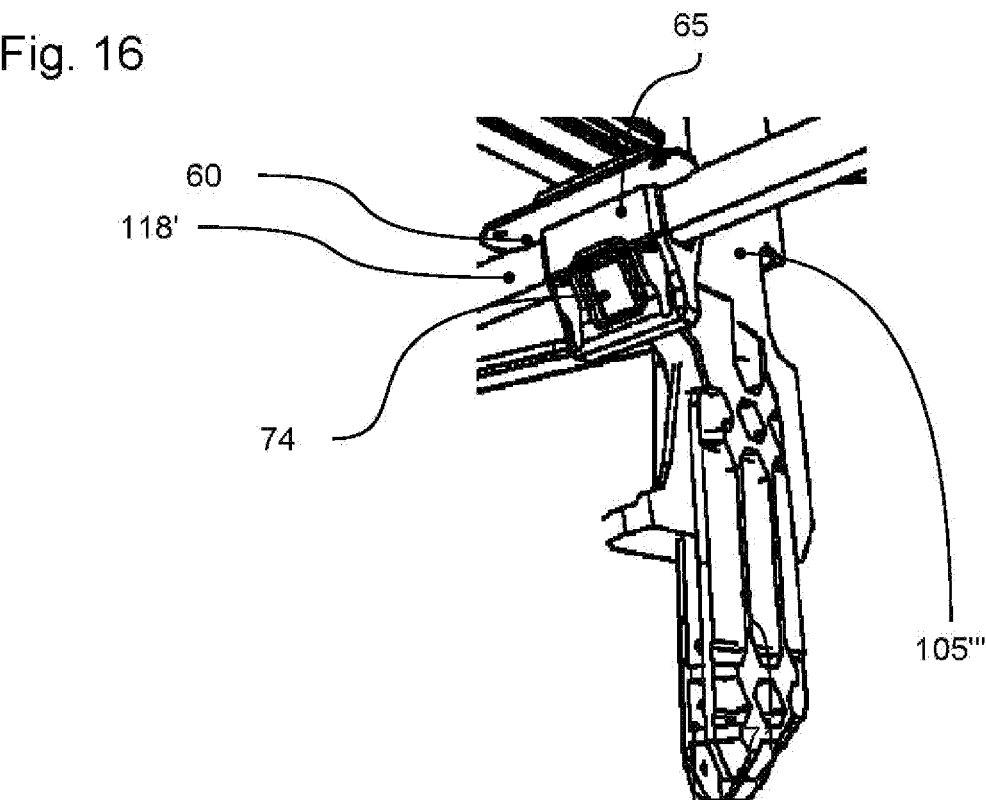
FIGS. 16 and 17 show further views on the fastening body from FIG. 15.
Figure 17:
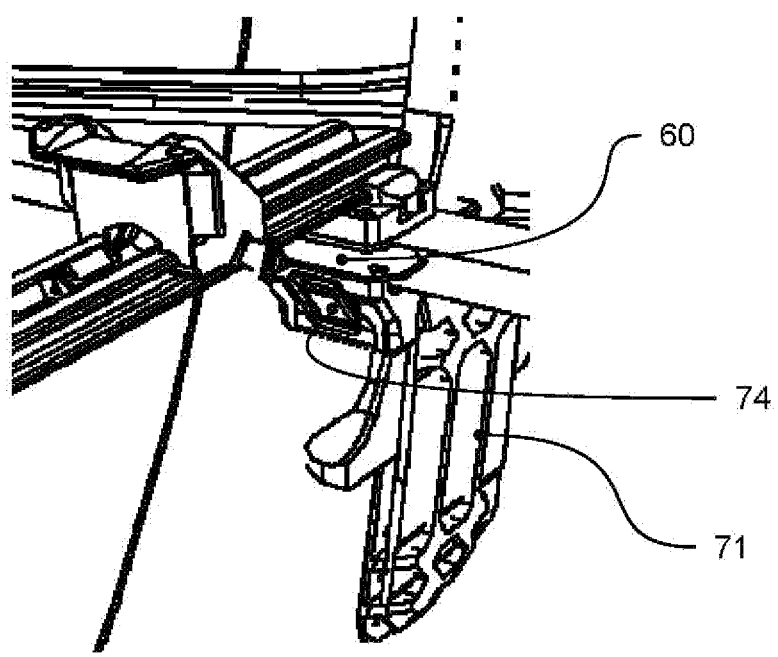
Figure 18:
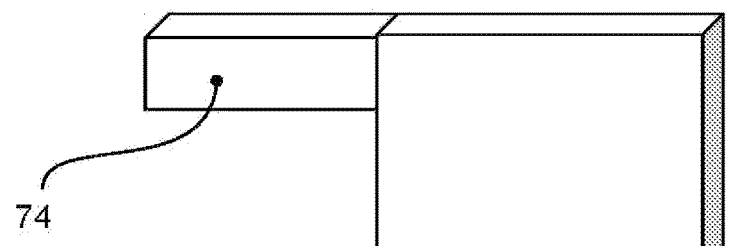
FIG. 18 shows a schematic representation of the fastening body from FIG. 15.
Figure 19:
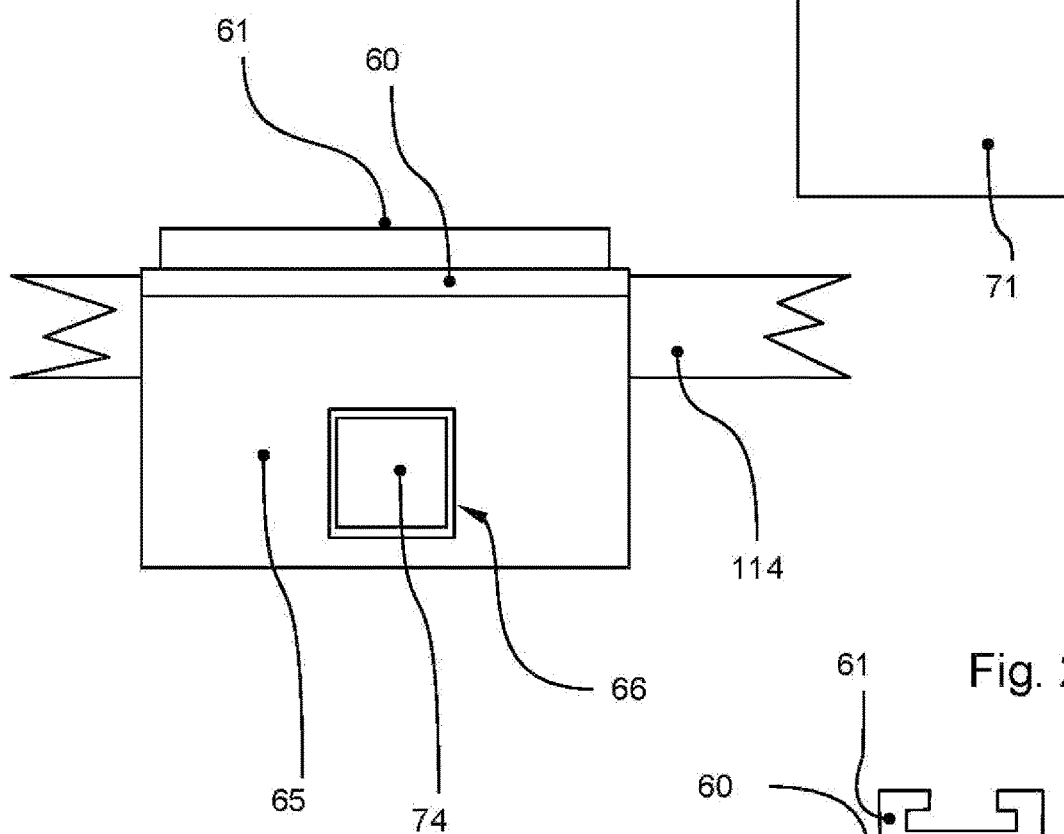
FIGS. 19 and 20 show schematic diagrams of a carriage for fastening a fitting.
Figure 20:
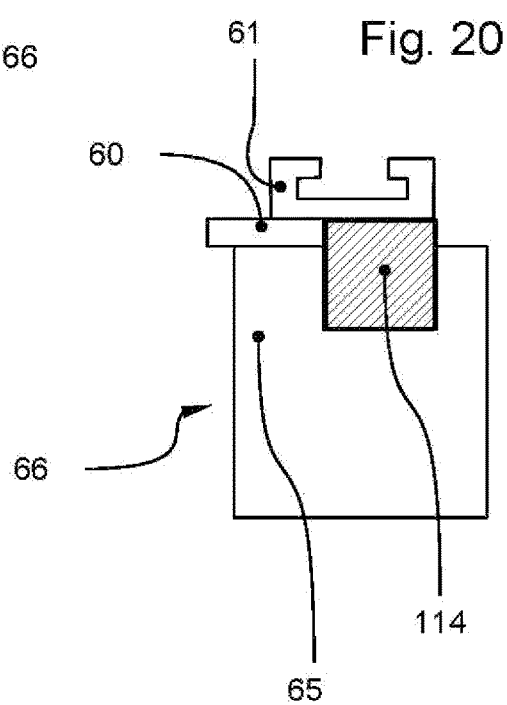

FIGS. 14 to 20 explain another embodiment example of the fitting 60, as shown schematically in FIG. 13. Thus there are areas in the aircraft where the side profile is not designed as a Z-profile 118, but rather as a kind of box profile 118'. FIG. 14 shows a view of a cargo deck in which the side profile changes from a Z-profile 118 to a box profile 118'. The transition essentially takes place with the frame 105". These special areas are located in the area of the cargo deck where the wing box is also located. Here, the side profiles must be arranged so that they can move in relation to the frames 105", 105'".

The embodiment of the fitting 60 shown in FIGS. 15 to 20 permits corresponding movement in the transverse direction of the aircraft (y-direction), wherein forces acting in the x- or z-direction are dissipated into the frames, in particular into the frames 105'". For this purpose, a carrier 70 is attached to the frame 105'" with its fastening body 71. The carrier 70 has a carrier nose 74, which projects into the interior of the aircraft along the transverse direction of the aircraft. The carrier nose 74 is received by a slide 65. For this purpose, a receptacle 66 is provided, which preferably fits positively in the z-direction and in the x-direction on the carrier nose 74. In the y-direction it allows a relative movement of the carrier nose 74 relative to the slide 65. The slide 65 embraces, as shown in particular in FIG. 20, the box profile 118' and is firmly screwed to the fitting 60. A movement of the box profile 118' relative to the slide 65 is not intended.

According to the invention, it is not inevitably necessary for the carrier 70 with the fastening body 71 to be screwed to the side of a frame. Instead, the fastening body 71 can grip cantilevers of a frame and thus form a positive fit to the frame. Furthermore, it is possible to attach the fastening body 71 to a base of the frame existing in this area or to connect the fastening body directly or indirectly to the wing box. This has the advantage that high forces can be gently introduced into this structure of the aircraft.

FIG. 21 shows a section through the fuselage of an aircraft. The upper and lower cargo decks 110 and 120 are shown in the section. Container 1 is located on the upper cargo deck 110, slightly offset from the center of cargo deck 110 (to the left in the image plane). The side guides 10, 10', 10" according to the invention allow a corresponding staggered arrangement due to the shiftability of the side guide devices 40, 40'.

In addition to optimum utilization of the cargo deck, this arrangement has the advantage that hazardous goods that have to be checked during the flight can also be transported.

As indicated in the figure, areas that can be walked on by the personnel remain free.

LIST OF REFERENCE NUMERALS

1 Container
10, 10', 10" Side guide
20 Fastening rail
21a, 21b Upper engagement strip
22a, 22b Lower engagement strip
24a, 24a', 24a", 24a''', 24a'''' Hole
25, 25', 25", 25''' Fastening base hole
27 Guide groove
30, 30' Fastening base
31, 31', 31" Hole pin
32' Blocking element
34 Strip
40, 40' Side guide device
41 Angle profile
41' Bolt claw
43, 43' Fastening pin
44 Swivel axis
45 Guide roller
47 First guide carriage
48, 48' Sloping surfaces
49, 49' Spring bearing
60 Fitting
61 Perforated rail segment
62 Projection
65 Slide
66 Receptacle
70 Carrier
71 Fastening body
74 Carrier nose
100 Aircraft
101 Outer skin
105, 105', 105", 105''' Frames
107, 107' Shear beam
110 Upper cargo deck
111, 111' Crossbeam
112 Longitudinal beam
114 Perforated rail
118 Z-profile
118' Box profile
120 Lower cargo deck
v Longitudinal direction of the fastening rail
l Perforated rail axis
A, B, C, D Latching positions
D1 Rail width
D2 First clear width of the adapter
D3 Base width
D4 Second clear width of the adapter
L Rail length

The invention claimed is:

1. A side guide for guiding and/or holding cargo items, in particular containers and/or pallets, in an aircraft, comprising:
a fastening rail extending in a longitudinal direction;
at least one side guide device which can be fastened to the fastening rail in the longitudinal direction at different positions,
at least one first fastening device and at least one second fastening device for fastening the side guide to a cargo deck of the aircraft,
wherein at least the first fastening device engages around the fastening rail and/or engages in the fastening rail in such a way that the first fastening device is displaceable in the longitudinal direction of the fastening rail relative to the second fastening device.

2. The side guide according to claim 1, wherein the fastening rail has essentially a cross-section of a double-T beam, wherein at least one of the fastening devices engages around a lower part of the double-T beam, and/or the at least one side guide device engages around an upper part of the double-T beam.

3. The side guide according to claim 1, wherein at least one of the fastening devices is fastened to the fastening rail via a positive fit with play in such a way that the fastening rail can be rotated from a right-angled basic position relative to the fastening device by at least 10 degrees.

4. The side guide according to claim 1, wherein the side guide device is mounted on the fastening rail so as to be displaceable in the longitudinal direction of the fastening rail.

5. The side guide according to claim 1, wherein at least one guide roller is mounted in the fastening rail such that the roller is rotatable about an axis of rotation, wherein the guide roller is displaceably and/or relocatably arranged in such a way that the axis of rotation extends essentially parallel to the longitudinal direction of the fastening rail.

6. The side guide according to claim 1, including a fastening pin for fixing the at least one side guide device at the different positions with respect to the fastening rail, wherein the fastening rail comprises a plurality of holes for receiving the fastening pin.

7. The side guide according to claim 1, wherein the fastening rail has a width of at most 10 cm and/or a rail length of at least 15 cm.

8. The side guide according to claim 1, including at least two side guide devices, wherein one of the side guide devices comprises a stop and/or a bolt claw which is fastened to the fastening rail in such a way that the stop or bolt claw can be pivoted from a raised working position into a lowered rest position, and/or wherein the stop or the bolt claw is rotatably fastened about a pivot axis to the fastening rail, wherein the pivot axis comprises a fixing device via which forces occurring during holding are transmitted to the fastening rail.

9. The side guide according to claim 8, wherein the stop or the bolt claw has inclined surfaces on at least one side, which are designed for moving the stop or the bolt claw from the working position into the rest position when a cargo item passes over it in one direction, wherein the direction is different from a holding direction of the stop or the bolt claw.

10. The side guide according to claim 1, wherein at least one of the fastening devices has a strip for inserting the fastening device into a perforated rail along an insertion direction and at least one pin opposite the strip for securing the fastening device against displacement transversely to the insertion direction.

11. A side guide group, comprising a plurality of side guides according to claim 1, wherein the side guide devices comprise at least one profile rail which is slidably mounted on the fastening rails.

12. A cargo loading deck having at least one side guide according to claim 1.

13. An aircraft having a cargo deck, in particular according to claim 12, wherein the aircraft comprises the following load-bearing structural elements:
   outer skin of the aircraft,
   frames connected to the aircraft outer skin;
   crossbeams attached to the frames;
   longitudinal beams fastened to the crossbeams;
   side profiles extending parallel to the longitudinal beams; and
   shear beams connecting the side profiles to the aircraft outer skin;
   wherein the side guide comprises: a fastening rail of the side guide extends in the transverse direction of the aircraft, the fastening rail is connected via a first fastening point and a second fastening point to load-bearing structural elements of the aircraft, and the first fastening point is located above one of the side profiles and the second fastening point is located above one of the crossbeams.

14. The aircraft according to claim 13, wherein there is no further fastening point between the first and second fastening points.

15. The aircraft according to claim 13, wherein the first fastening point is a maximum of 30 cm away from the aircraft outer skin.

16. The aircraft according to claim 13, wherein the fastening rail is fastened to the side profile at the first fastening point via a fitting, and/or the fastening rail is fastened at the second fastening point to a perforated rail mounted on a crossbeam.

17. The aircraft according to claim 13, wherein the at least one side guide is arranged in the region of a wing box of the aircraft, wherein the at least one side guide is connected at the first fastening point to a slide and at the second fastening point to one of the crossbeams, wherein the slide is movably fitted on a projection in the transverse direction of the aircraft, said projection being connected to one of the frames and/or the wing box.

18. The aircraft according to claim 17, wherein the slide has a receptacle which extends in the transverse direction of the aircraft and in which the projection engages.

* * * * *